(12) United States Patent
De'Longhi et al.

(10) Patent No.: US 10,042,525 B2
(45) Date of Patent: Aug. 7, 2018

(54) COFFEE MACHINE AND RELATIVE METHOD FOR COMMANDING IT

(71) Applicant: De'Longhi Appliances S.R.L., Treviso (IT)

(72) Inventors: Giuseppe De'Longhi, Treviso (IT); Andrea Zottarel, San Dona' di Piave (Venice) (IT)

(73) Assignee: De'Longhi Appliances S.R.L., Treviso (IT)

( * ) Notice: Subject to any disclaimer, the term of this patent is extended or adjusted under 35 U.S.C. 154(b) by 338 days.

(21) Appl. No.: 14/755,368

(22) Filed: Jun. 30, 2015

(65) Prior Publication Data
US 2016/0004233 A1  Jan. 7, 2016

(30) Foreign Application Priority Data
Jul. 1, 2014  (IT) .............................. MI2014A1191

(51) Int. Cl.
| | |
|---|---|
| G06F 3/0484 | (2013.01) |
| A47J 31/00 | (2006.01) |
| G06F 3/0482 | (2013.01) |
| G05B 19/02 | (2006.01) |
| G06F 3/0489 | (2013.01) |
| G06F 3/0481 | (2013.01) |
| G06F 3/0488 | (2013.01) |
| G05B 15/02 | (2006.01) |
| G06K 9/00 | (2006.01) |
| A47J 31/44 | (2006.01) |

(52) U.S. Cl.
CPC ............ *G06F 3/0484* (2013.01); *A47J 31/00* (2013.01); *A47J 31/4407* (2013.01); *G05B 15/02* (2013.01); *G05B 19/02* (2013.01); *G06F 3/0482* (2013.01); *G06F 3/0488* (2013.01); *G06F 3/0489* (2013.01); *G06F 3/04817* (2013.01); *G06F 3/04883* (2013.01); *G06K 9/00* (2013.01)

(58) Field of Classification Search
None
See application file for complete search history.

(56) References Cited

U.S. PATENT DOCUMENTS

| | | | | |
|---|---|---|---|---|
| 6,759,072 | B1 * | 7/2004 | Gutwein | A23F 5/243 426/429 |
| 2014/0123081 | A1 * | 5/2014 | Park | G06F 21/36 715/863 |

* cited by examiner

*Primary Examiner* — Qing Yuan Wu
(74) *Attorney, Agent, or Firm* — Blank Rome LLP

(57) ABSTRACT

The coffee machine comprises an electronic controller connected to a user interface, which, in turn, comprises an input unit that receives the input commands from a user, the input unit having a surface that is touch-sensitive and/or sensitive to swipe gestures with a finger, the input unit also being configured for the acquisition of commands in the form of symbols defined by sequences of points (n1, n2, . . . ni) of the sensitive surface that can be selected by touching and/or swiping the sensitive surface with a finger, the controller having a comparator configured to identify an acquired symbol by comparing it with an archive of symbols present in a memory of the machine and to activate the machine function command corresponding to the identified symbol.

19 Claims, 2 Drawing Sheets

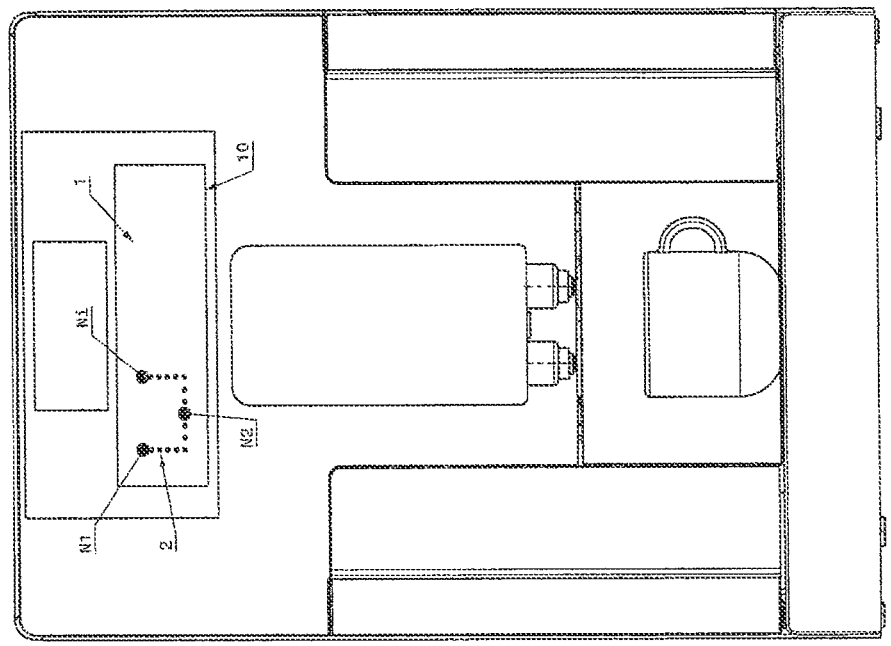

COFFEE MACHINE AND RELATIVE METHOD FOR COMMANDING IT

RELATED APPLICATIONS

This application claims benefit of priority under 35 USC § 119 of Italy Patent Application No. MI2014A001191, filed Jul. 1, 2014, entitled "Coffee Machine and Relative Method for Commanding It," which application is incorporated herein by reference.

FIELD OF THE INVENTION

The present invention refers to a coffee machine and to the relative method for commanding it.

BACKGROUND OF THE INVENTION

A coffee machine comprises an electronic controller and a user interface generally defined by a keypad as the input interface and by a display as the output interface.

Normally, touching a key on the keypad corresponds to a function that is processed by the electronic controller.

To simplify use of the coffee machine, the primary functions of the coffee machine are associated with each key, for example the dispensation of coffee, the dispensation of hot water, the dispensation of steam, etc.

In this manner, the user is facilitated in the management of the primary functions for daily use of the coffee machine.

However, there are secondary functions of the coffee machine that are used less frequently, such as the descaling function, but, nonetheless, they are important for ensuring proper functioning of the coffee machine.

To avoid weighing down the user interface, these functions are normally activated by simultaneously pressing a number of keys, or by keeping one or more keys pressed at length.

The drawback found with conventional coffee machines consists in the fact that it is often not a simple matter for the user to activate a secondary function, much less remember the command associated with the activation of that secondary function, especially after a prolonged period of time in which it has not been used.

SUMMARY OF THE INVENTION

The technical task of the present invention is therefore to realize a coffee machine and relative command method that allow to eliminate the cited technical drawbacks of the prior art.

Within the scope of this technical task, an aim of the invention is to realize a coffee machine that allows to command the activation of all of its functions in a simple and intuitive manner.

Another aim of the invention is to realize a coffee machine equipped with a user interface that enables all the functions of the machine to be commanded in a simple and intuitive manner, while remaining extremely simplified.

The technical task, as well as these and other aims, according to the present invention, are achieved by realizing a coffee machine comprising an electronic controller connected to a user interface, which, in turn, comprises an input unit that receives the input commands from a user, and characterized in that the input unit has a surface that is touch-sensitive and/or sensitive to swipe gestures with a finger, and said input unit is configured for the acquisition of commands in the form of symbols defined by sequences of points of the sensitive surface that can be selected by touching and/or swiping the sensitive surface with a finger, said controller having a comparator configured to identify an acquired symbol by comparing it with an archive of symbols present in a memory of the machine and to activate the machine function command corresponding to the identified symbol.

Each symbol advantageously has a meaning that immediately recalls the machine function that is associated with it.

In a preferred embodiment of the invention, the input unit comprises a display and the sensitive surface is a surface of the display.

In a preferred embodiment of the invention, said display is configured to reproduce the path of a finger by displaying it.

In a preferred embodiment of the invention, the input unit comprises a keypad and the sensitive surface is a surface that includes at least one set of keypad keys.

In a preferred embodiment of the invention, the keypad is a keypad which is displayed by the display so that it is a touchscreen keypad.

In a preferred embodiment of the invention, the sensitive surface is configured for the acquisition of a command in the form of a symbol defined by a spatially continuous sequence of points that can be selected by touching and/or swiping the sensitive surface with a finger.

In a preferred embodiment of the invention, the sensitive surface is configured for the acquisition of a command in the form of a symbol defined by a spatially discontinuous sequence of points that can be selected by touching and/or swiping the sensitive surface with a finger.

In a preferred embodiment of the invention, the sensitive surface is configured for the acquisition of a command in the form of a symbol representing an alphanumeric character.

In a preferred embodiment of the invention, the controller has means for validating acquisition of a symbol.

In a preferred embodiment of the invention in which the input unit comprises at least one keypad, the validating means is configured to validate acquisition if among the acquired points there are points where at least two of the keypad keys are located.

The present invention also discloses a method for commanding a coffee machine having an electronic controller and an input unit, characterized in that the input unit is provided as a surface that is touch-sensitive and/or sensitive to swipe gestures with a finger, and in that the input unit acquires commands in the form of symbols defined by sequences of points of the sensitive surface selected by touching and/or swiping the sensitive surface with a finger, and the electronic controller identifies a symbol thus acquired by comparing it with an archive of symbols present in a memory of the machine, and commands the execution of a function of the machine associated with the symbol identified.

In a preferred embodiment of the invention, said function is a secondary function of the machine, for example a descaling function.

BRIEF DESCRIPTION OF THE DRAWINGS

Further characteristics and advantages of the invention will become more apparent from the description of a preferred, but not exclusive, embodiment of the coffee machine according to the invention, which is illustrated by way of approximate and non-limiting example in the attached drawings, of which:

FIG. 2 schematically shows a coffee machine equipped with a user interface in accordance with a second preferred embodiment of the invention.

DETAILED DESCRIPTION OF THE ILLUSTRATED EMBODIMENTS

Figure 1:
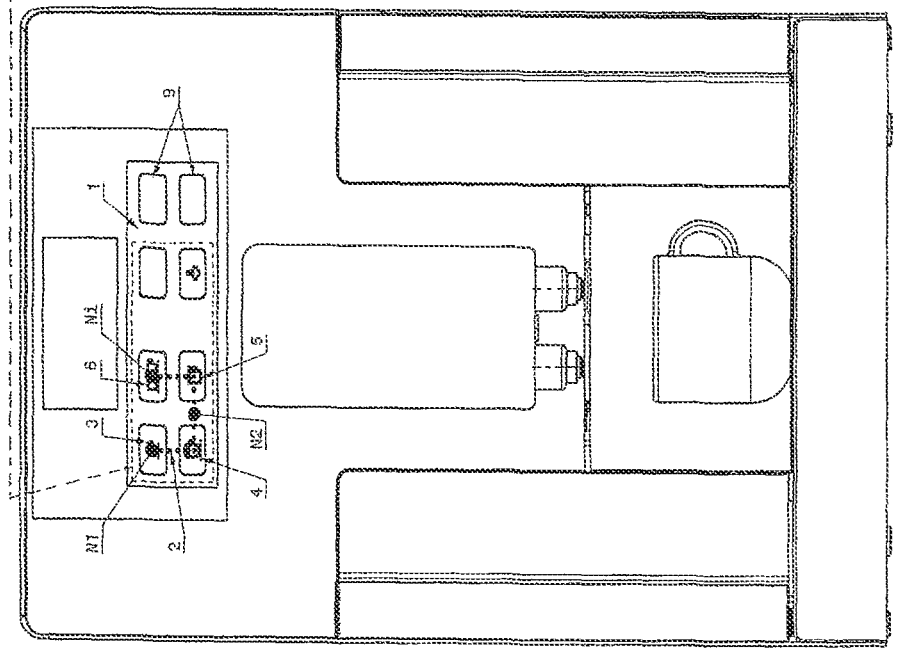
FIG. 1 schematically shows a coffee machine equipped with a user interface in accordance with a first preferred embodiment of the invention.

Equivalent parts in the various preferred embodiments of the invention will be indicated with the same reference number.

With reference to the figures cited, a coffee machine is schematically shown, comprising in a known manner an infusion unit, a hydraulic circuit for supplying the infusion unit, which, in turn, comprises a boiler and a feed pump, and further comprising a user interface comprising an input unit and an output unit, generally provided by a display and/or LED warning lights, and an electronic controller in communication with all components of the machine to manage its operation.

The input unit advantageously has a surface 1 that is touch-sensitive and/or sensitive to swipe gestures with a finger, and the input unit is configured for the acquisition of commands in the form of symbols 2 defined by sequences of points n1, n2, . . . ni of the sensitive surface 1 that can be selected by touching and/or swiping the sensitive surface 1 with a finger.

The sensitive surface 1 can be configured for the acquisition of commands in the form of symbols 2, each one of which is defined by a spatially continuous or discontinuous sequence of points n1, n2, . . . ni that can be selected by touching and/or swiping the sensitive surface 1 with a finger.

Preferably, but not necessarily, the sensitive surface 1 is configured for the acquisition of commands in the form of symbols 2 representing alphanumeric characters.

In the solution illustrated in FIG. 1, the input unit comprises a keypad, particularly a touchscreen keypad, and the sensitive surface 1 is a surface that includes a set of keys 3, 4, 5, 6, 7, 8 of the touchscreen keypad. In addition to the sensitive surface 1, the input unit of the machine can naturally comprise other modules, for example modules with adjustment knobs 9.

In the solution illustrated in FIG. 2, the input unit instead comprises a display and the sensitive surface 1 is a surface of the display.

In this case, the display is preferably part of the input unit 10 incorporated in the coffee machine, for example in the control panel of the coffee machine.

The electronic controller advantageously has a comparator configured to identify an acquired symbol 2 by comparing it with an archive of symbols 2 present in a memory of the machine and to activate the machine function command corresponding to the identified symbol 2.

The electronic controller preferably has means for validating acquisitions of the input unit.

The validating means is configured to validate an acquisition only if it complies with one or more predetermined acquisition criteria.

In particular, with reference to the solution illustrated in FIG. 1, an acquisition criterion determines validation of the acquisition if the points where at least two of the keypad keys 3, 4, 5, 6, 7, 8 are located, are among the acquired points.

Referring again to the solution illustrated in FIG. 1, another acquisition criterion, which can be alternative or complementary to the preceding criterion, determines validation of the acquisition if the points acquired first or last in terms of time are points where one of the keypad keys 3, 4, 5, 6, 7, 8 is located or points that are, in turn, within a given neighborhood of the points where one of the keypad keys 3, 4, 5, 6, 7, 8 is located.

A possible acquisition criterion that can be used with reference to the solution illustrated in FIG. 2 instead determines validation of the acquisition if the acquired points spatially constitute a continuous sequence of points that defines a given minimum length.

The method for commanding the coffee machine comprises the acquisition of a symbol 2 by the input unit and the identification of the acquired symbol 2 by the electronic controller by means of a comparison with an archive of symbols 2 present in a memory of the machine, as well as commanding execution of a function of the machine associated with the symbol 2 identified.

The method for commanding is briefly outlined below with particular reference to the solution illustrated in FIG. 1.

The archive of symbols 2 in the memory comprises symbols 2 that are reproducible by swiping with a finger along open or closed broken swipe lines on the sensitive surface 1 with a finger and/or by touching given points of the sensitive surface 1 with a finger and in a time sequence.

Each swipe line has a starting point at a point of the sensitive surface 1 where a key 3, 4, 5, 6 is present, and an end point at a point of the sensitive surface 1 where the same or another key 3, 4, 5, 6, 7, 8 is present, and it passes through at least one point of the sensitive surface 1 where a key 3, 4, 5, 6, 7, 8 differing from the key is present at the starting point and/or the key present at the end point.

In this specific case, one possible procedure is illustrated for executing the "Use" command with which the user commands the display of the parameters of use of the coffee machine.

The "Use" command is activated by swiping the sensitive surface 1 using a finger, starting from a point where the key 3 is positioned on to the point where the key 6 is positioned, passing through the points where the keys 4 and 5 are positioned, so that the swipe path defines a U-shaped symbol which brings to mind the first letter of the "Use" command.

The "U" symbol is acquired and associated with the "Use" command by the comparator.

At this point, the electronic controller displays the parameters of use of the coffee machine on the display of the output unit.

In an alternative solution, the "Use" command can be activated by touching, in a time sequence, the point where the key 3 is positioned on the sensitive surface 1 with a finger, the point where the key 4 is positioned, the point where the key 5 is positioned and the point where the key 6 is positioned, in such a manner as to define a U-shaped symbol indicated in its essential points, which consist of the two end points and the two intersecting points between the base and the two legs of the "U".

It should be noted that the output unit according to the invention does not necessarily replace a conventional input unit, but preferably it is integrated with it, or possibly added to it, expanding its functionality.

In the solution illustrated in FIG. 1 for example, the same keys 3, 4, 5, 6, 7, 8, which individually represent a specific command of the machine in a conventional manner, can represent other commands when considered in combinations according to certain criteria. For example, individually, the key 3 can represent the command for a single dose of coffee, the key 4, the command for double dose of coffee, the key 5 the command for a "lungo" coffee dose, the key 6 for two cups of coffee, the key 7 the command for steam and the key 8 the command for a cappuccino. However, multiple combinations of the keys 3, 4, 5, 6, 7, 8 can create new commands: by swiping the sensitive surface 1 with a finger, starting from the point where the key 3 is positioned on to the point where the key 4 is positioned, a symbol consisting of the letter "I" is defined, with which a corresponding command can be associated; by swiping the sensitive surface 1 with a finger, starting from the point where the key 3 is positioned and then in a sequence on to the point where the key 4 is positioned and then to the point where the key 5 is positioned, a symbol consisting of the letter "L" is defined, with which a corresponding command can be associated in an intuitive manner; by swiping the sensitive surface 1 with a finger, starting from the point where the key 3 is positioned and then in a sequence on to the point where the key 4 is positioned, to the point where the key 5 is positioned, to the point where the key 6 is positioned, and then back again to where the key 3 is positioned, a symbol consisting of the letter "O" is defined, with which a corresponding command can be associated in an intuitive manner; and so on.

With reference to the solution illustrated in FIG. 2, the sensitive surface 1 is a writing surface where the user writes the command symbols for the commands he/she wishes to have executed.

In this specific case, one possible procedure is illustrated for executing the "Coffee" command with which the user commands the preparation of a cup of coffee.

The "Coffee" command is activated by swiping the sensitive surface 1 with a finger so as to define a C-shaped symbol which brings to mind the first letter of the "Coffee" command.

The "C" symbol is acquired and associated with the "Coffee" command by the comparator.

At this point, the electronic controller commands the activation of the boiler, commands closure of the infusion unit and commands the feed pump to supply water for execution of the infusion process.

A function can be implemented to enable the electronic controller to rewrite in standard format on the display of the input unit the symbol written by the user, to have immediate feedback regarding symbol entered and to permit the user to confirm or delete the command if it does not correspond to his/her initial choice.

The coffee machine and the relative command method thus conceived are susceptible to numerous modifications and variants, all of which falling within the scope of the inventive concept. Moreover, all details may be replaced with other technically equivalent elements.

The materials used, as well as the dimensions, may in practice be of any type, according to needs and the state of the art.

What is claimed is:

1. A coffee machine comprising an electronic controller connected to a user interface, which, in turn, comprises an input unit including a keypad that receives input commands from a user, wherein the input unit has a surface, including at least one set of keypad keys, that is touch-sensitive and/or sensitive to swipe gestures with a finger, and said input unit is configured for acquisition of commands in the form of symbols defined by sequences of points of the sensitive surface that can be selected by touching and/or swiping the sensitive surface with a finger, said electronic controller including a comparator configured to identify an acquired symbol by comparing the symbol with an archive of symbols present in a memory of the coffee machine, and to activate the coffee machine function command corresponding to the identified symbol, said electronic controller further including a validator configured to validate the acquired symbol if the sequence of points included in the acquired symbol comprise points where at least two of the keypad keys are located, where validation is required prior to activation of the coffee machine function.

2. The machine according to claim 1, wherein said input unit comprises a display and said sensitive surface is a surface of said display.

3. The machine according to claim 2, wherein said display is configured to reproduce the path of a finger by displaying the path of the finger.

4. The machine according to claim 1, wherein, if the sequence of points includes at least one point location on a key and at least one point location that is not on a key, the controller is configured to rewrite in standard format on the input unit the symbol acquired over the at least one point location on the key.

5. The machine according to claim 4, wherein the controller is further configured to display on the input unit parameters of use of the coffee machine based upon the symbol acquired on the sensitive surface that includes at least one point location on a key and at least one point location that is not on a key.

6. The machine according to the claim 1, wherein said keypad is a keypad displayed by the display so that the keypad is a touchscreen keypad.

7. The machine according to claim 1, wherein said sensitive surface is configured for acquisition of commands in the form of symbols defined by continuous sequences of points that can be selected by touching and/or swiping the sensitive surface with a finger.

8. The machine according to claim 7, wherein said sensitive surface is configured for acquisition of commands in the form of symbols representing alphanumeric characters.

9. The machine according to claim 1, wherein said sensitive surface is configured for acquisition of commands in the form of symbols defined by discontinuous sequences of points that can be selected by touching and/or swiping the sensitive surface with a finger.

10. The machine according to claim 9, wherein said sensitive surface is configured for acquisition of commands in the form of symbols representing alphanumeric characters.

11. The machine according to claim 1, wherein activation of the coffee machine function involves changing an operating status of at least one component of the coffee machine, including at least an infusion unit of the coffee machine and a hydraulic circuit for supplying the infusion unit.

12. The machine according to claim 1, wherein the controller activating the coffee machine function involves at least activation of a boiler of the coffee machine, commands closure of the infusion unit, and commands a feed pump to supply water for execution of the infusion process.

13. The machine according to claim 1, wherein the controller is further configured to rewrite in standard format on the input unit the symbol acquired for user review.

14. The machine according to claim 13, wherein the controller is further configured to provide immediate feedback regarding the symbol acquired, permitting a user to confirm or delete the coffee machine function command corresponding to the symbol rewritten on the input unit.

15. A method for commanding a coffee machine having an electronic controller and an input unit, where the input unit is provided as a surface that includes a key pad and is touch-sensitive and sensitive to swipe gestures with a finger, where the input unit acquires commands in the form of symbols representing alphanumeric characters defined by sequences of points of the sensitive surface selected by swiping the sensitive surface with a finger, and the electronic controller: identifies an alphanumeric symbol thus acquired by comparing the acquired symbol with an archive of symbols present in a memory of the machine; validates the acquired symbol if the sequence of points included in the acquired symbol comprise points where at least two of the keypad keys are located; where, if validated, rewrites the acquired symbol on the input unit for confirmation or deletion; and, if confirmed, commands execution of a function of the machine associated with the acquired alphanumeric symbol identified, validated and confirmed.

16. The method for commanding a coffee machine according to claim 15, further comprising execution of a function of the machine including a further, secondary function of the machine.

17. A coffee machine comprising an electronic controller connected to a user interface, which, in turn, comprises an input unit that receives input commands from a user, wherein the input unit has a surface, including at least one set of keypad keys, that is touch-sensitive and/or sensitive to swipe gestures with a finger, where said input unit is configured for acquisition of commands in the form of symbols defined by sequences of points of the sensitive surface that can be selected by touching and/or swiping the sensitive surface with a finger, said electronic controller including a comparator configured to identify an acquired symbol by comparing the symbol with an archive of symbols present in a memory of the coffee machine, the controller configured to rewrite in standard format on the input unit the symbol acquired, said controller further including a validator configured to validate the acquired symbol if the sequence of points included in the acquired symbol comprise points where at least two of the keypad keys are located, and if validated, said controller is configured to activate the coffee machine function command corresponding to the identified symbol.

18. The machine according to claim 17, wherein the controller is further configured to provide immediate feedback regarding the symbol acquired, permitting a user to confirm or delete the coffee machine function command corresponding to the symbol rewritten on the input unit.

19. The machine according to claim 17, wherein if the sequence of points includes at least one point location on a key and at least one point location that is not on a key, the controller is configured to rewrite in standard format on the input unit the symbol acquired over the at least one point location on the key.

* * * * *